United States Patent
Eberlein et al.

(10) Patent No.: US 11,797,879 B2
(45) Date of Patent: Oct. 24, 2023

(54) MACHINE LEARNING ON DISTRIBUTED CUSTOMER DATA WHILE PROTECTING PRIVACY

(71) Applicant: SAP SE, Walldorf (DE)

(72) Inventors: Peter Eberlein, Malsch (DE); Volker Driesen, Malsch (DE)

(73) Assignee: SAP SE, Walldorf (DE)

( * ) Notice: Subject to any disclaimer, the term of this patent is extended or adjusted under 35 U.S.C. 154(b) by 1015 days.

(21) Appl. No.: 16/410,076

(22) Filed: May 13, 2019

(65) Prior Publication Data

US 2020/0364604 A1  Nov. 19, 2020

(51) Int. Cl.
G06N 20/00 (2019.01)
G06F 12/0802 (2016.01)

(52) U.S. Cl.
CPC ........ *G06N 20/00* (2019.01); *G06F 12/0802* (2013.01); *G06F 2212/10* (2013.01)

(58) Field of Classification Search
CPC .. G06F 12/0802; G06F 2212/10; G06N 20/00
See application file for complete search history.

(56) References Cited

U.S. PATENT DOCUMENTS

| | | | |
|---|---|---|---|
| 7,523,142 B2 | 4/2009 | Driesen et al. |
| 7,720,992 B2 | 5/2010 | Brendle et al. |
| 8,126,919 B2 | 2/2012 | Eberlein |
| 8,200,634 B2 | 6/2012 | Driesen et al. |
| 8,225,303 B2 | 7/2012 | Wagner et al. |
| 8,291,038 B2 | 10/2012 | Driesen |
| 8,301,610 B2 | 10/2012 | Driesen et al. |
| 8,356,010 B2 | 1/2013 | Driesen |
| 8,375,130 B2 | 2/2013 | Eberlein et al. |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,467,817 B2 | 6/2013 | Said et al. |
| 8,479,187 B2 | 7/2013 | Driesen et al. |
| 8,560,876 B2 | 10/2013 | Driesen et al. |

(Continued)

FOREIGN PATENT DOCUMENTS

| | | |
|---|---|---|
| EP | 0991005 | 9/1999 |
| JP | 2000293421 | 10/2000 |

(Continued)

OTHER PUBLICATIONS

Extended European Search Report issued in European Application No. 19204050.9 dated May 13, 2020, 10 pages.

(Continued)

*Primary Examiner* — Baboucarr Faal
(74) *Attorney, Agent, or Firm* — Fish & Richardson P.C.

(57) ABSTRACT

Computer-implemented systems and computer-implemented methods include the following. A request to train a machine-learning (ML) model is received at a training broker. Anonymized data for training the model is obtained by the training broker from each individual data source of a plurality of data sources. The anonymized data is accessed through a data science schema being provided by anonymization of sensitive information of production data from each individual data source. Access to the anonymized data is provided to a data vendor for training the ML model using the anonymized data.

17 Claims, 7 Drawing Sheets

(56) References Cited

U.S. PATENT DOCUMENTS

| | | | |
|---|---|---|---|
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,631,406 B2 | 1/2014 | Driesen et al. |
| 8,645,483 B2 | 2/2014 | Odenheimer et al. |
| 8,706,772 B2 | 4/2014 | Hartig et al. |
| 8,732,083 B2 | 5/2014 | Vasing et al. |
| 8,751,573 B2 | 6/2014 | Said et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,031,910 B2 | 5/2015 | Driesen |
| 9,032,406 B2 | 5/2015 | Eberlein |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,274,757 B2 | 3/2016 | Said et al. |
| 9,336,227 B2 | 5/2016 | Eberlein et al. |
| 9,354,860 B2 | 5/2016 | Eberlein et al. |
| 9,354,871 B2 | 5/2016 | Eberlein et al. |
| 9,361,093 B2 | 6/2016 | Meissner et al. |
| 9,361,326 B2 | 6/2016 | Driesen et al. |
| 9,367,199 B2 | 6/2016 | Klemenz et al. |
| 9,372,685 B1 | 6/2016 | Luettge et al. |
| 9,436,724 B2 | 9/2016 | Driesen et al. |
| 9,471,659 B2 | 10/2016 | Driesen et al. |
| 9,501,516 B2 | 11/2016 | Driesen |
| 9,519,675 B2 | 12/2016 | Specht et al. |
| 9,632,802 B2 | 4/2017 | Said et al. |
| 9,633,107 B2 | 4/2017 | Said et al. |
| 9,639,448 B2 | 5/2017 | Gebhard et al. |
| 9,652,744 B2 | 5/2017 | Eberlein et al. |
| 9,678,740 B2 | 6/2017 | Heine et al. |
| 9,703,554 B2 | 7/2017 | Eberlein et al. |
| 9,720,994 B2 | 8/2017 | Driesen et al. |
| 9,721,116 B2 | 8/2017 | Driesen et al. |
| 9,767,424 B2 | 9/2017 | Biewald et al. |
| 9,800,689 B2 | 10/2017 | Said et al. |
| 9,836,299 B2 | 12/2017 | Eberlein et al. |
| 9,854,045 B2 | 12/2017 | Said et al. |
| 9,858,309 B2 | 1/2018 | Eberlein et al. |
| 9,898,279 B2 | 2/2018 | Eberlein et al. |
| 9,898,494 B2 | 2/2018 | Eberlein et al. |
| 9,898,495 B2 | 2/2018 | Eberlein et al. |
| 10,025,568 B2 | 7/2018 | Mayer et al. |
| 10,055,215 B2 | 8/2018 | Specht et al. |
| 10,061,788 B2 | 8/2018 | Said et al. |
| 10,157,068 B2 | 12/2018 | Arians et al. |
| 10,185,552 B2 | 1/2019 | Eberlein et al. |
| 10,191,733 B2 | 1/2019 | Driesen et al. |
| 10,230,708 B2 | 3/2019 | Eberlein |
| 10,268,472 B2 | 4/2019 | Eberlein et al. |
| 10,268,692 B2 | 4/2019 | Mayer et al. |
| 2006/0171405 A1 | 8/2006 | Brendle et al. |
| 2007/0185720 A1 | 8/2007 | Eberlein et al. |
| 2008/0222248 A1 | 9/2008 | Eberlein et al. |
| 2009/0106371 A1 | 4/2009 | Schmidt-Karaca et al. |
| 2009/0106372 A1 | 4/2009 | Schmidt-Karaca et al. |
| 2009/0150479 A1 | 6/2009 | Eberlein et al. |
| 2009/0172110 A1 | 7/2009 | Eberlein et al. |
| 2010/0161648 A1 | 6/2010 | Eberlein et al. |
| 2011/0154445 A1 | 6/2011 | Schmidt-Karaca et al. |
| 2012/0041988 A1 | 2/2012 | Driesen |
| 2012/0136839 A1 | 5/2012 | Eberlein et al. |
| 2013/0085810 A1 | 4/2013 | Driesen et al. |
| 2013/0166415 A1 | 6/2013 | Odenheimer et al. |
| 2013/0166416 A1 | 6/2013 | Eberlein |
| 2013/0324201 A1 | 12/2013 | Eberlein et al. |
| 2013/0325672 A1 | 12/2013 | Odenheimer et al. |
| 2013/0339488 A1 | 12/2013 | Eberlein et al. |
| 2014/0019429 A1 | 1/2014 | Driesen et al. |
| 2014/0025441 A1 | 1/2014 | Eberlein et al. |
| 2014/0047319 A1 | 2/2014 | Eberlein |
| 2014/0117076 A1 | 5/2014 | Eberlein |
| 2014/0149158 A1 | 5/2014 | Odenheimer et al. |
| 2014/0325069 A1 | 10/2014 | Odenheimer et al. |
| 2015/0006608 A1 | 1/2015 | Eberlein et al. |
| 2015/0188890 A1 | 7/2015 | Said et al. |
| 2015/0220576 A1 | 8/2015 | Eberlein |
| 2015/0220591 A1 | 8/2015 | Eberlein et al. |
| 2015/0222665 A1 | 8/2015 | Eberlein et al. |
| 2016/0026698 A1 | 1/2016 | Eberlein et al. |
| 2016/0063050 A1 | 3/2016 | Schoen et al. |
| 2016/0085777 A1 | 3/2016 | Engelko et al. |
| 2016/0098253 A1 | 4/2016 | Hutzel et al. |
| 2016/0127325 A1 | 5/2016 | Odenheimer et al. |
| 2016/0379128 A1 | 12/2016 | Bouchard et al. |
| 2017/0116296 A1 | 4/2017 | Specht et al. |
| 2017/0123787 A1 | 5/2017 | Burkhardt et al. |
| 2017/0161291 A1 | 6/2017 | Specht et al. |
| 2017/0286467 A1 | 10/2017 | Eberlein et al. |
| 2017/0329505 A1 | 11/2017 | Richter et al. |
| 2017/0344362 A1 | 11/2017 | Mayer et al. |
| 2017/0351442 A1 | 12/2017 | Specht et al. |
| 2018/0018590 A1* | 1/2018 | Szeto .............. G06N 20/10 |
| 2018/0081668 A1 | 3/2018 | Eberlein |
| 2018/0095953 A1 | 4/2018 | Mayer et al. |
| 2018/0137010 A1 | 5/2018 | Mayer et al. |
| 2018/0137145 A1 | 5/2018 | Mayer et al. |
| 2018/0137146 A1 | 5/2018 | Mayer et al. |
| 2018/0144117 A1 | 5/2018 | Engler et al. |
| 2018/0146056 A1 | 5/2018 | Eberlein |
| 2018/0218171 A1 | 8/2018 | Bellala et al. |
| 2018/0232382 A1 | 8/2018 | Mayer et al. |
| 2018/0268154 A1 | 9/2018 | Specht et al. |
| 2018/0285097 A1 | 10/2018 | Radermacher et al. |
| 2018/0285390 A1 | 10/2018 | Mayer et al. |
| 2018/0316685 A1 | 11/2018 | Eberlein et al. |
| 2018/0316772 A1 | 11/2018 | Eberlein et al. |
| 2018/0329930 A1 | 11/2018 | Eberlein et al. |
| 2018/0332082 A1* | 11/2018 | Baumgart ............. G06F 21/34 |
| 2018/0357561 A1* | 12/2018 | Selvarajan ............ H04L 12/66 |
| 2019/0012609 A1 | 1/2019 | Fishler et al. |
| 2020/0349271 A1* | 11/2020 | Binkley ............. G06F 16/353 |

FOREIGN PATENT DOCUMENTS

| | | |
|---|---|---|
| JP | 2018194904 | 12/2018 |
| WO | 2018017467 | 1/2018 |

OTHER PUBLICATIONS

JP Office Action issued in Japanese Appln. No. 2019-229271, dated Oct. 4, 2021, 12 pages (With English Translation).
U.S. Appl. No. 14/982,615, filed Dec. 29, 2015, Arians et al.
U.S. Appl. No. 15/996,804, filed Jun. 4, 2018, Hauck et al.
U.S. Appl. No. 15/983,812, filed May 18, 2018, Eberlein et al.
U.S. Appl. No. 15/983,469, filed May 18, 2018, Driesen et al.
U.S. Appl. No. 15/970,499, filed May 3, 2018, Eberlein et al.
U.S. Appl. No. 15/883,680, filed Jan. 30, 2018, Eberlein.
U.S. Appl. No. 15/874,317, filed Jan. 18, 2018, Eberlein et al.
U.S. Appl. No. 15/847,627, filed Dec. 19, 2017, Boer et al.
U.S. Appl. No. 15/794,501, filed Oct. 26, 2017, Birn et al.
U.S. Appl. No. 15/794,424, filed Oct. 26, 2017, Auer et al.
U.S. Appl. No. 15/794,381, filed Oct. 26, 2017, Schlarb et al.

(56) References Cited

OTHER PUBLICATIONS

U.S. Appl. No. 15/794,368, filed Oct. 26, 2017, Auer et al.
U.S. Appl. No. 15/794,362, filed Oct. 26, 2017, Auer et al.
U.S. Appl. No. 15/794,335, filed Oct. 26, 2017, Schlarb et al.
U.S. Appl. No. 15/794,305, filed Oct. 26, 2017, Auer et al.
U.S. Appl. No. 15/794,261, filed Oct. 26, 2017, Birn et al.
U.S. Appl. No. 16/297,057, filed Mar. 8, 2019, Eberlein.
U.S. Appl. No. 16/219,375, filed Dec. 13, 2018, Eberlein et al.
U.S. Appl. No. 16/219,371, filed Dec. 13, 2018, Eberlein et al.
U.S. Appl. No. 16/219,358, filed Dec. 13, 2018, Eberlein et al.
U.S. Appl. No. 16/214,724, filed Dec. 10, 2018, Eberlein et al.
U.S. Appl. No. 16/208,920, filed Dec. 4, 2018, Eberlein et al.
U.S. Appl. No. 16/200,427, filed Nov. 26, 2018, Mueller et al.
U.S. Appl. No. 16/197,888, filed Nov. 21, 2018, Meissner et al.
U.S. Appl. No. 16/173,225, filed Oct. 29, 2018, Eberlein et al.
U.S. Appl. No. 16/005,927, filed Jun. 12, 2018, Kruempelmann et al.

Sarkar [online], "Continuous Numeric Data," TowardsDataScience.com: Understanding Feature Engineering (Part 1), Jan. 4, 2018, [retrieved on Apr. 25, 2019], retrieved from: URL <https://towardsdatascience.com/understanding-feature-engineering-part-1-continuous-numeric-data-da4e47099a7b>, 28 pages.

Sarkar [online], "Categorical Data," TowardsDataScience.com: Understanding Feature Engineering (Part 2), Jan. 6, 2018, [retrieved on Apr. 25, 2019], retrieved from: URL <https://towardsdatascience.com/understanding-feature-engineering-part-2-categorical-data-f54324193e63>, 20 pages.

Wikipedia.org [online], "Differential Privacy," Wikipedia reference, last edited on Apr. 17, 2019, [retrieved on Apr. 25, 2019], retrieved from: URL <https://en.wikipedia.org/wiki/Differential_privacy>, 9 pages.

JP Office Action issued in Japanese Appln. No. 2019-229271, dated Jul. 4, 2022, 6 pages (With English Translation).

* cited by examiner

MACHINE LEARNING ON DISTRIBUTED CUSTOMER DATA WHILE PROTECTING PRIVACY

BACKGROUND

Machine learning techniques can provide improved results when production data is used, for example, instead of manufactured test data. However, production data can include information that is private or sensitive. Customers, such as companies or enterprises, who benefit from the machine learning techniques may have concerns about providing private or sensitive information. Private information can include, for example, personally identifiable information (PII), such as names, addresses, phone numbers, account numbers, and computer credentials. Sensitive information can include, for example, account balances, other numeric quantities or measurements, and demographic information. As a result, customers avoid providing their data to a vendor creating a model, as the data may contain privacy-related or generally sensitive information.

SUMMARY

The present disclosure describes techniques for performing machine learning on distributed customer data while maintaining a minimal impact to privacy. In an implementation, a computer-implemented method includes: receiving, at a training broker, a request to train a machine-learning (ML) model; obtaining, by the training broker from each individual data source of a plurality of data sources, anonymized data for training the model, the anonymized data accessed through a data science schema being provided by anonymization of sensitive information of production data from each individual data source; and providing, to a data vendor, access to the anonymized data for training the ML model using the anonymized data.

The described subject matter can be implemented using a computer-implemented method; a non-transitory, computer-readable medium storing computer-readable instructions to perform the computer-implemented method; and a computer-implemented system including one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, real production data can be used to train models without compromising private or sensitive information, increasing data privacy for customers. Second, a model-training service using the data of different customers can be created without the customers needing to replicate their data to the vendor database. Third, the use of real production data can improve the performance and accuracy of models because generated data may not provide adequate results. Fourth, machine learning models can be created for distributed customers on an individual basis. Fifth, individual customer data used to train models cannot be traced back to a data source, such as an individual person.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
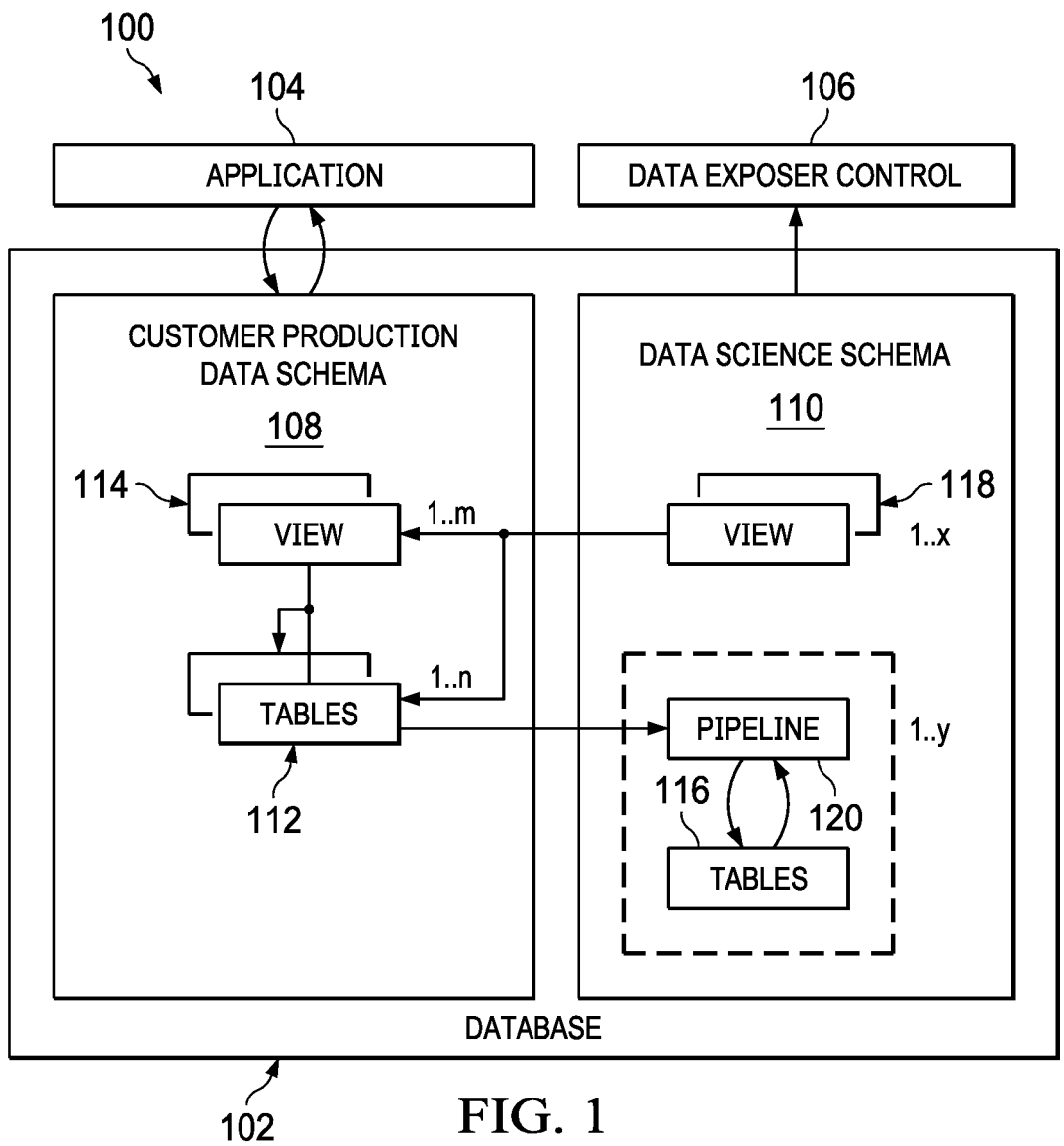
FIG. 1 is a block diagram showing an example of a preprocessing system, according to an implementation of the present disclosure.

The following detailed description describes techniques for performing machine learning on distributed customer data while protecting privacy and is presented to enable any person skilled in the art to make and use the disclosed subject matter in the context of one or more particular implementations. Various modifications, alterations, and permutations of the disclosed implementations can be made and will be readily apparent to those of ordinary skill in the art. The general principles defined can be applied to other implementations and applications without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Many customers use standard software that is deployed to their customer site(s). For example, the customers may use the same enterprise resource planning (ERP) software. In some cases, the ERP software includes add-on features, such as customer-specific extensions. Some of the add-on features can be related to machine learning (ML) functions, which can include techniques that apply to all customers and their data. For example, the ML techniques can be based on a foundation of the data that is common to the customers using the same ERP software. The data can be in a common format, including a format that is shared among different types of applications. As an example, ML techniques can apply to sales orders, sales order items, invoices, human resources (HR) data, and combinations of the data. Each of these data types can use data structures based on de-facto industry standards defined for data sets stored in different software products that are mapped to one common data format.

Software vendors, for example, may want to create ML models that are based on information used in a given product or a suite of products. ML models, data analysis, and model training can often benefit from using actual customer data, or production data. Production data may be necessary, for example, in scenarios in which generated data does not provide acceptable or realistic results. In this case, customers may be asked to provide production data for on-premises products or cloud-based products. Data access regulations or requirements may exist that prohibit the vendor from reading customer data. Some companies may prohibit assess to certain types of customer data due to company policies. Government or legal regulations may exist, such as General Data Protection Regulation (GDPR) rules, that prohibit access to sensitive data (e.g., PII).

As a result of data privacy concerns, for example, challenges can exist regarding the best ways to create machine learning models based on actual customer data. The challenges can become more difficult when the data is distributed among several customers (for example, at different locations) and vendors are not allowed direct access to the data. Even when some of the data is accessible, maintaining customer data privacy still presents a challenge.

Data Preprocessing

In some implementations, before data is accessed for use in a model, preprocessing of the data can occur. The preprocessing can be guided so that the machine learning process does not directly access or use the data as stored in the database. Preprocessing mechanisms provided by software vendor typically depends on specific data structures and data types. For example, fields not needed by the training process can be filtered out. The filtered-out fields can include, for example, personal data that is not needed for the models. The filtering can ensure that the data is not read by, or made accessible to, the training process. In some implementations, mechanisms can be used on data sets or databases to transform fields such as text, strings, and global unique identifiers (GUIDs) to numbers (including random numbers) or to other forms that prevent reverse engineering and re-creation of the source data.

FIG. 1 is a block diagram showing an example of a preprocessing system 100, according to an implementation of the present disclosure. The preprocessing system 100 can be used for preprocessing data in a database 102 that serves an application 104. A data exposer control 106 can provide data to a model. The database 102 includes a customer production data schema 108 that serves the application 104 and a data science schema 110 that serves the data exposer control 106. The production data schema 108 provides access to database tables 112 through views 114. The data science schema 110 provides access to database tables 116 through views 118. In some implementations, the data exposer control 106 can also access data through a pipeline 120 that receives a subset of production data.

In some implementations, the preprocessing system 100 can support filtering that is established through the use of an additional database schema, such as the data science schema 110. The additional database schema can contain objects, such as the views 118, which grant access to particular subsets of the production data that would otherwise be accessible using the customer production data schema 108. In some implementations, views can be created that selectively grant read access (while disabling write access) to particular fields. For example, data fields containing names can be filtered out, or names or other fields can be mapped to global unique identifiers (GUIDs) that anonymize the original names. GUIDs can replace values representing private information that would normally be used, for example, to join two or more tables. In some implementations, numeric values can be scaled by an arbitrary number. In this way, amplitudes of (and relative relationships within) numerical data can be compared without exposing actual values.

In some implementations, a second filtering mechanism can include the creation and use of a data pipeline, such as the pipeline 120. When using the data pipeline, for example, data that is read using the customer production data schema 108 can be transformed and stored in the database tables 116, accessible by the data science schema 110. Customers (for example, through their administrators) can control the data science schema 110, including defining the data that is accessible using the data science schema 110. User interfaces can be used by customers to view the types of information that is exposed. Views, tables, and table rows can be deleted for certain data sets that are not to be exposed to machine learning. Customers can be provided with application programming interfaces (APIs) that are used to expose the data, so that the customers can verify that exposed data is acceptable to the customer.

Figure 2:
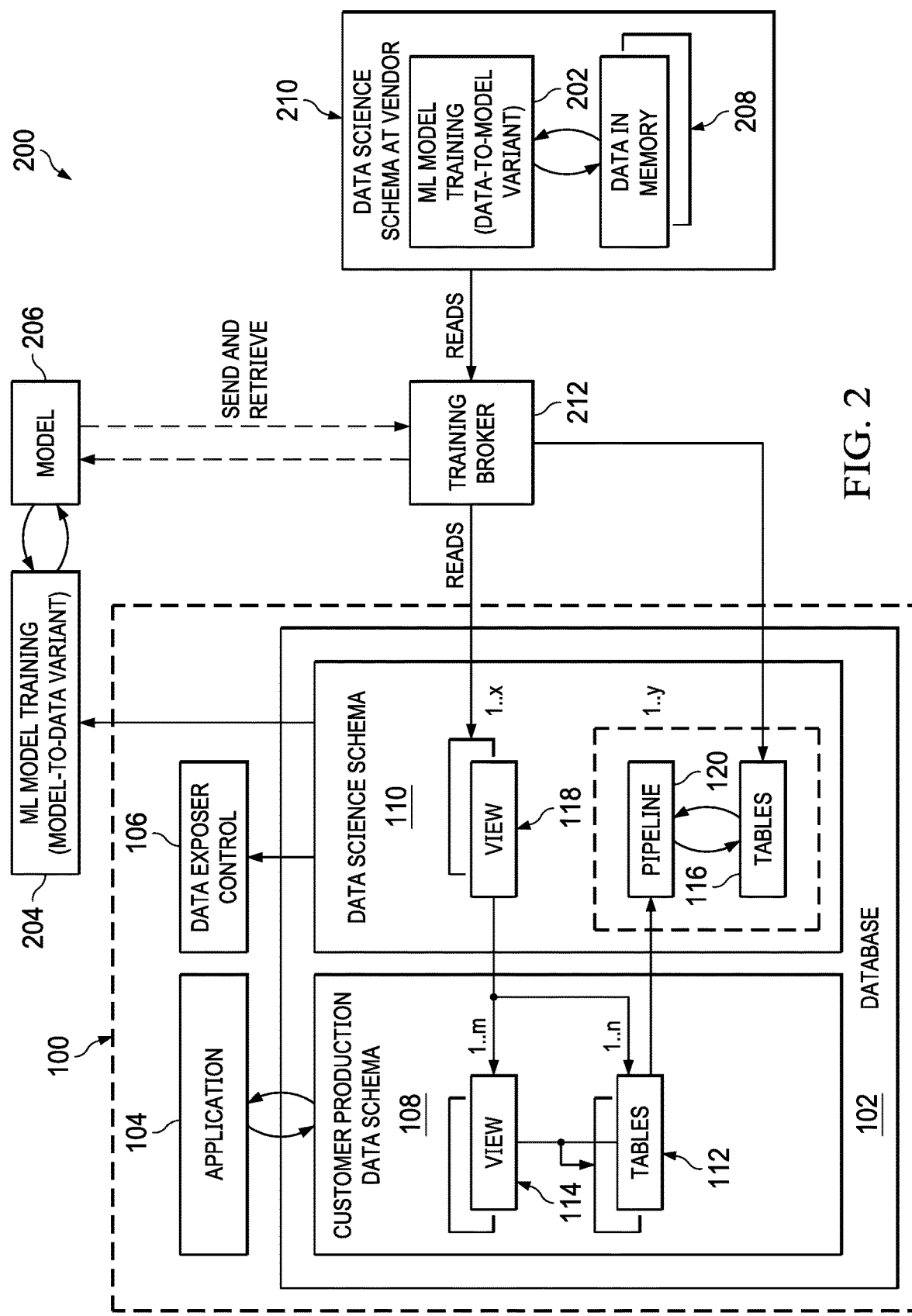
FIG. 2 is a block diagram showing an example of a model training system that uses the preprocessing system, according to an implementation of the present disclosure.

FIG. 2 is a block diagram showing an example of a model training system 200 that uses the preprocessing system 100, according to an implementation of the present disclosure. The model training system 200 can use machine learning (ML) model training 202 or 204 (or a combination) to train a model 206.

Training

Training of the model 206 can occur after preprocessing of the data has been completed. In some implementations, at two least different approaches can be used to perform the training: 1) data-to-model ML model training 202, or 2) and model-to-data ML model training 204.

In the data-to-model variant (or approach), data in memory 208 is brought to the model (for example, by accessing the data or by receiving the data). The data is accessed using a data science schema 210 at the vendor. Data passes through a training broker 212.

In the model-to-data variant, the model is provided for use at a data location (for example, by providing the model to a customer's location). As the model is trained for a given customer, the updated model is provided to the training broker 212, which can pass the updated model to additional customers.

In some implementations, the data-to-model variant can be considered to be an optimal approach. This is because specific hardware that is needed to run the training cannot be assumed to exist at the location of the data. For example, it may be the case that not all customers have graphics processing unit (GPU) or application-specific integrated circuit (ASIC) hardware that are required to execute the model. Also, if the training consumes significant resources, and if the resources are not available at a customer data center, then the resources can be provided by the vendor.

In some implementations, the model-to-data variant can be limited to models that are capable of being distributed to data locations (for example, for "transfer learning"). As a result, the model-to-data variant may be more suited for large data volumes, as only the model (and not the data) is sent through network for the training.

Data-to-Model Variant

Figure 3A:
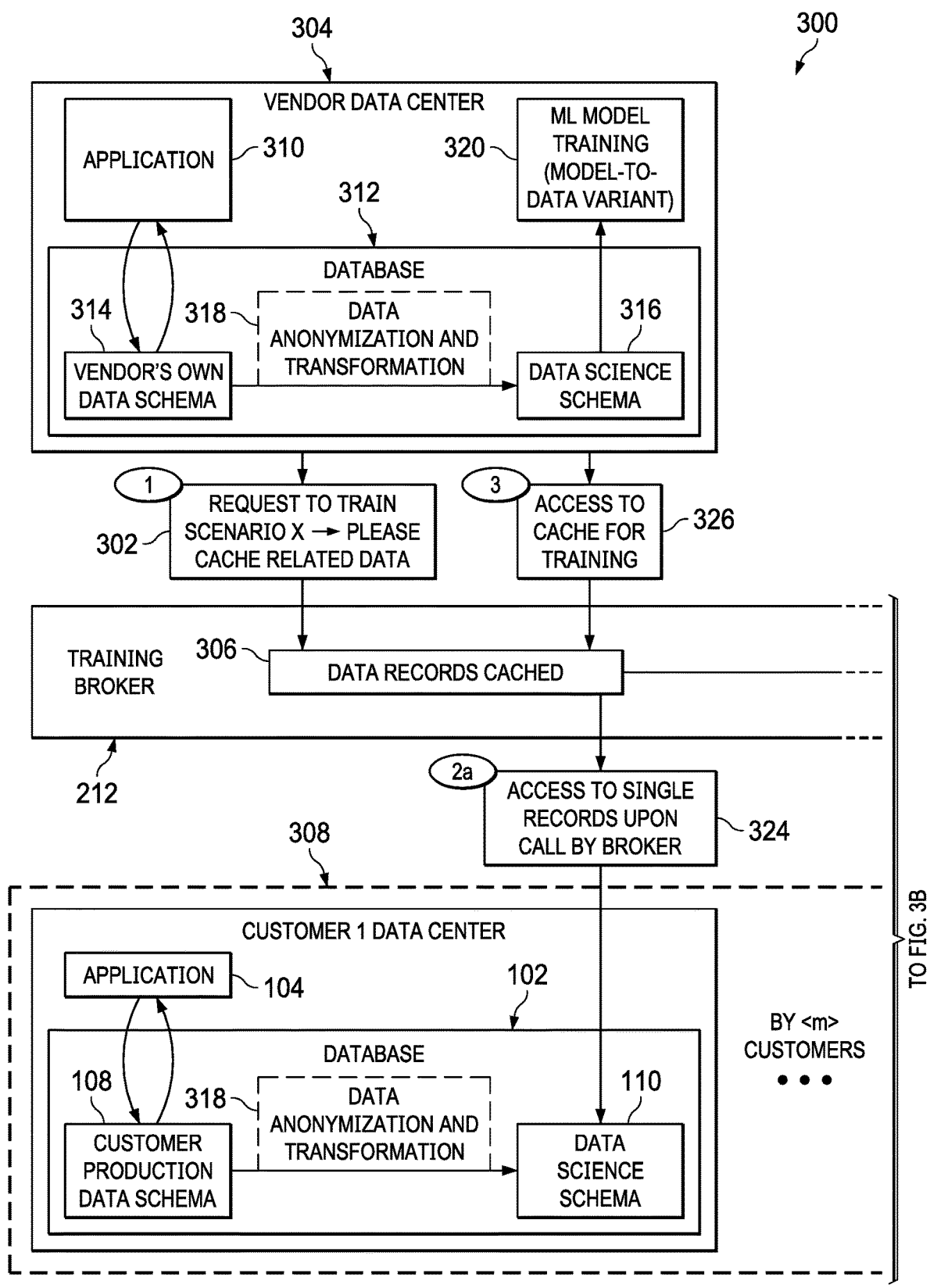
FIGS. 3A and 3B are block diagrams collectively showing an example of a data-to-model variant of model training system, according to an implementation of the present disclosure.
Figure 3B:
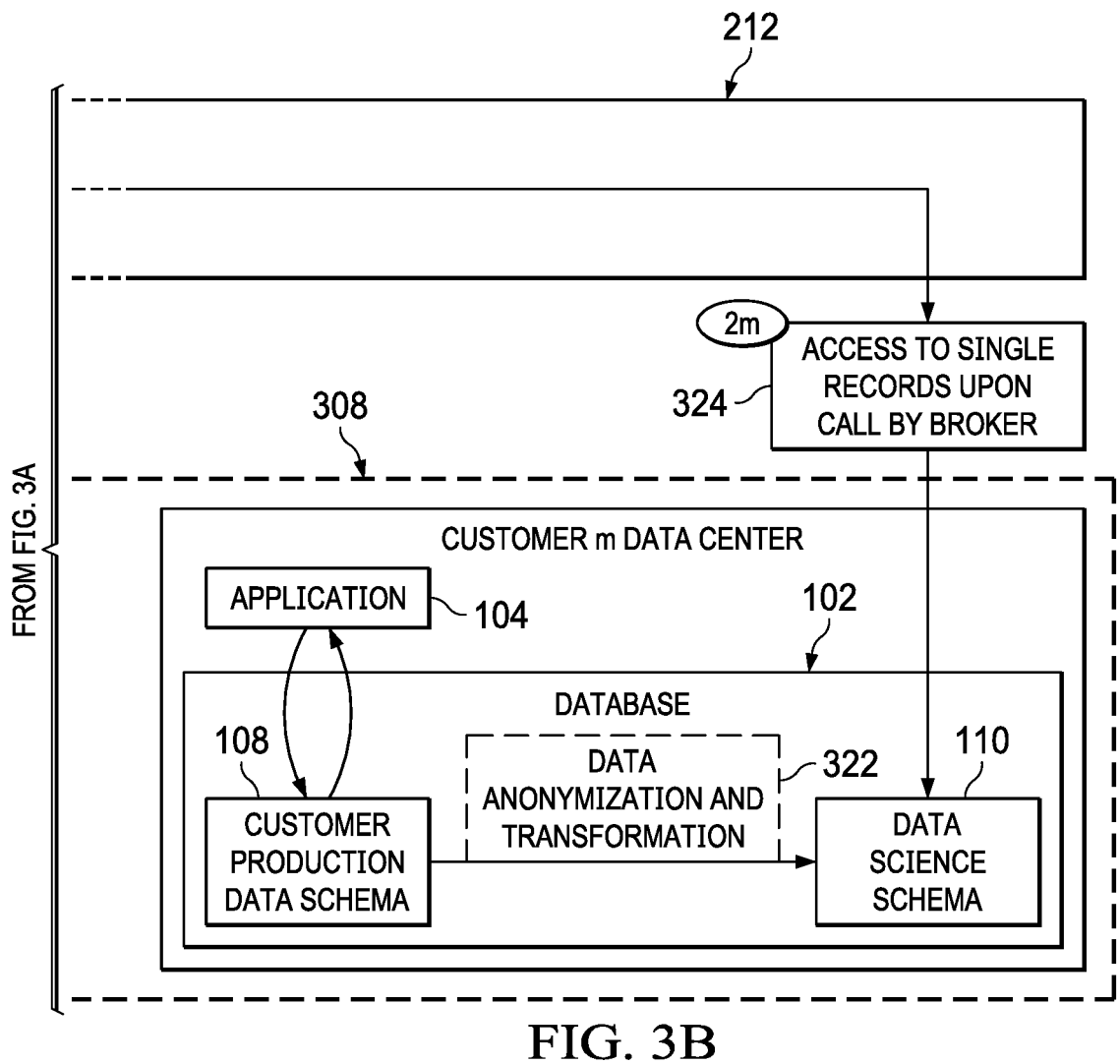

FIGS. 3A and 3B are block diagrams collectively showing an example of a data-to-model variant 300 of model training system, according to an implementation of the present disclosure. The data-to-model variant 300 can provide centralized training using distributed customer data. Before training occurs, the data can be preprocessed, for example, by reading the data from a data science schema in the customer database and caching the data in a training broker.

Model training can be initiated, for example, at step 1 302, when a request is made to train a scenario X, including requesting that the related data is be cached. For example, a vendor at a vendor data center 304 can specify which data is to be cached (306) for each particular training. The information identifying the data to be cached can be passed to the training broker 212. The vendor data center 304 can include components similar to components of customers 308, including an application 310 and a database 312. The database 312 includes a vendor's own data schema 314 and a data science schema 316. The vendor data center 304 includes a data-to-model ML training module 320 that can train the model. Data anonymization and transformation 318 can ensure that customer private and sensitive data are protected.

The training broker 212 can then read records from participating customers, which can be in any order, including a random order. For example, at steps 2a-2m 324, reading the data can include accessing single records of customers called by the training broker 212. After the data has been accessed and cached by the training broker 212, model training can occur at step 3 326 when access to the cache is provided for training. During the time that actual training is performed on data read from the training broker 212, the training broker 212 can deliver records randomly from all connected customers. As a result, the training algorithm does not access private or privacy-sensitive data owner information, including which data came from which customer.

Because the cache does not need to enforce unique key constraints of original database tables, rows with the same key can be read from different customers and cached. Customer names and database names of the customers (or other information enabling mapping record to specific customers) are not added to records in the cache. In some cases, these types of privacy protection techniques can be supervised by an external trusted third party.

The machine model training can read a superset of the data that represents the multiple data sets of the several different origins, for example, that are accessible by different customers. In some implementations, a minimum number of sources can be specified, meaning that data from a minimum number (for example, ten) of customers is to be used. In some implementations, external trusted third parties can supervise and enforce the minimum.

In some implementations, a set of white noise records can be introduced into the cache during reading. In this way, the training algorithm is unable to determine whether accessed data comes from any of the connected customer systems or from a white noise generator, for example. The white noise data set can be designed so as not to disturb the training of the model.

Model-to-Data Variant

Figure 4A:
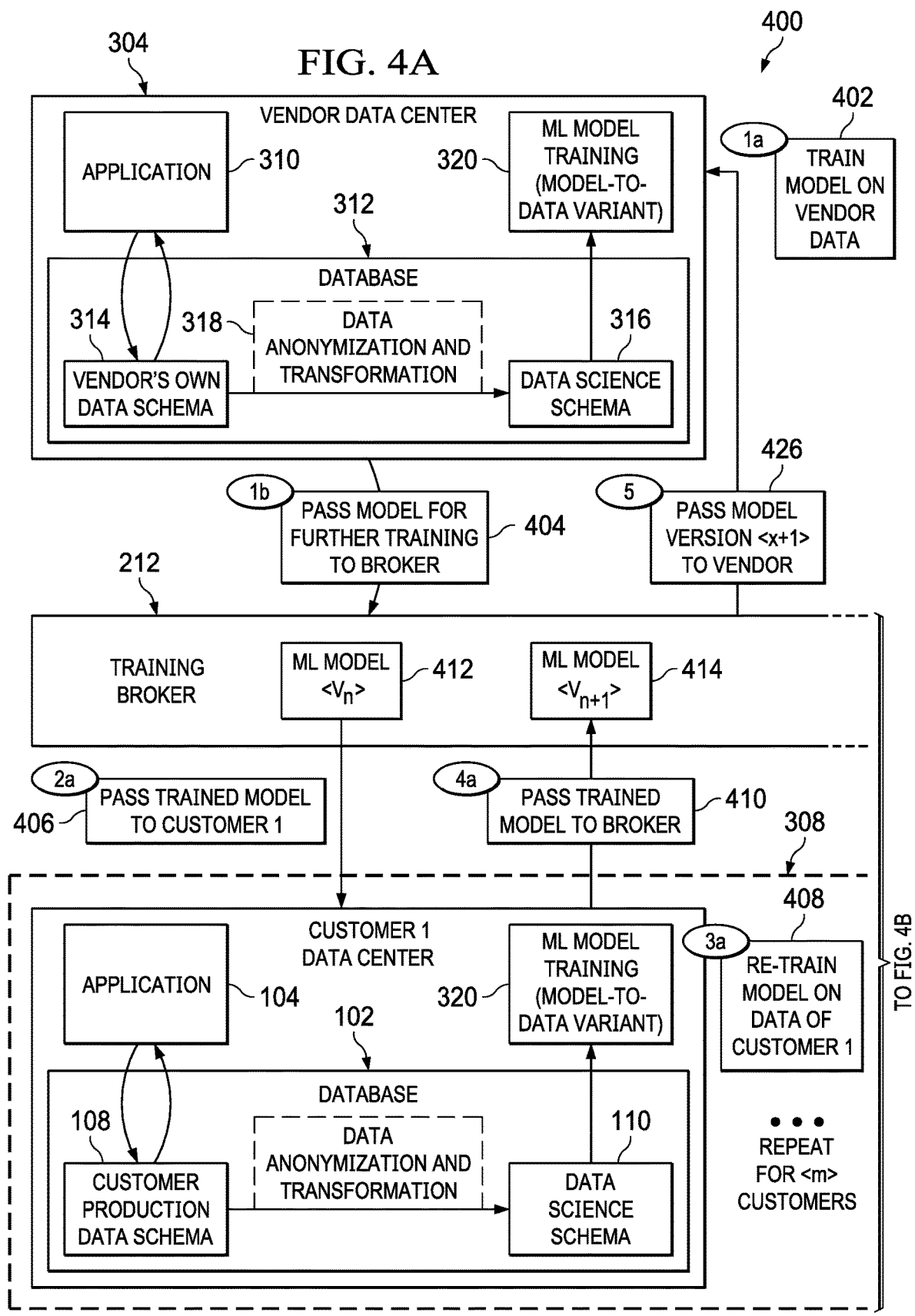
FIGS. 4A and 4B are block diagrams collectively showing an example of a model-to-data variant of model training system, according to an implementation of the present disclosure.
Figure 4B:
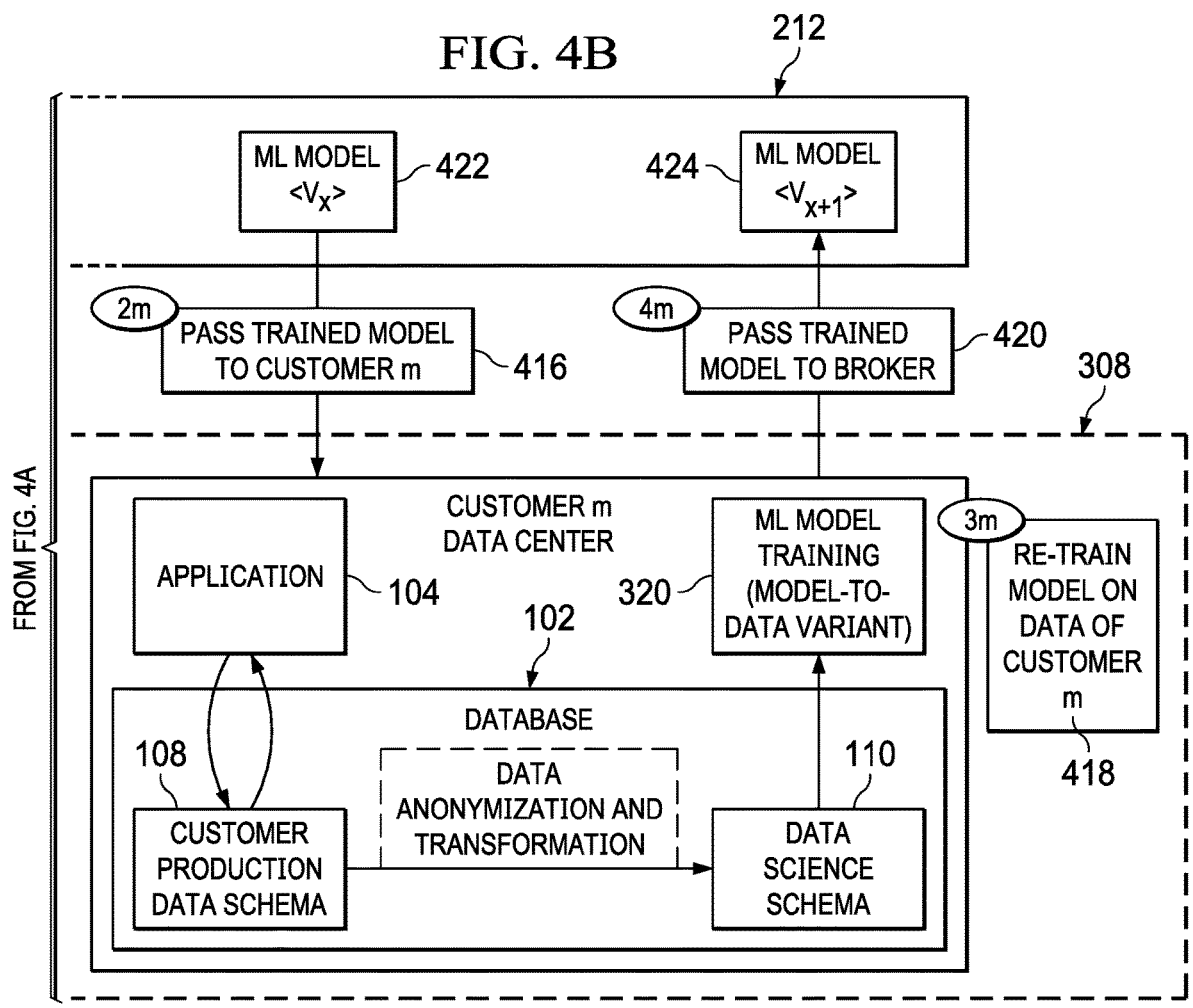

FIGS. 4A and 4B are block diagrams collectively showing an example of a model-to-data variant 400 of model training system, according to an implementation of the present disclosure. The model-to-data variant can support distributed training that is iterated over customer data. The model-to-data approach can be used for models enabled for "transfer learning" which encompasses the concept that a trained model can be improved by training with more data. In some implementations, the approach can be implemented in a way that is similar to neural networks, including the following steps.

At step 1a 402, the model is trained on vendor data. The root model can be created based on a vendor's own data, which can be generated by the vendor, where the data has a lower but still usable quality. The root model can initially be created in such a way as to protect the privacy of the initial customer's data. For example, when an updated version of the model from the first customer is subsequently returned to the training broker 212, the model is not exclusively based solely on the customer's data, and therefore cannot be mapped to the customer. At step 1b 404, the model is passed to the training broker 212 for further training.

Re-training of the model can then occur, for example, one customer at a time. At step 2a 406, the training broker 212 can provide the root model to a first customer of a pipeline of customers 308, for additional training on the customer's data. At step 3a 408, the first customer can re-train the model using the data of customer 1. At step 4a 410, after training the model, the first customer can pass the re-trained model to the training broker 212. As a result, as a model version 412 is re-trained, a model version 414 is created. In general, when the model is re-trained by a customer, a version $V_{n+1}$ of the model can be created from a version $V_n$ of the model. In this example, the version is n=1 after the model is passed to the training broker 212 for the first time at step 1b 404, and the version is n=2 after the model is re-trained by the first customer. After each version of the model is created, the updated model is then sent to the next customer, including for customers 2 to m of the pipeline of customers 308 in the current example.

Steps similar to the steps 406-410 can be repeated on a customer-by-customer basis for the remaining customers 2 to m. For example, at step 416, the training broker 212 can provide an updated version (for example, version $V_{x+1}$) of root model to the $m^{th}$ customer of the pipeline of customers 308. As a result, a model version $V_x$ 422 that is passed to the $m^{th}$ customer can be re-trained to create a model version $V_{x-1}$ 424.

Once the model is trained with the data of a number of customers, the model can be tested. At step 5 426, the training broker 212 can pass the model (for example, version x+1) to the vendor data center 304 where the updated model can be tested for accuracy by the vendor. The accuracy can be reported, for example, to a data scientist. Steps of the model-to-data variant 400 can be repeated until the accuracy of the model is determined to be good enough, for example, having an accuracy above a pre-determined threshold.

Expanding the Variants

In some implementations, both of the variants 300 and 400 can be extended to train using added public data, for example, using data from the Central Intelligence Agency (CIA) World Factbook or data from Wikipedia. For the data-to model variant 300, the public data can be accessed in the same manner as customer data and intermixed with real customer data. For the model-to-data variant 400, the public data can be used to train the root model. If it is desired that public data is to correlate with the customer data during training at a customer's location, the public data can be read during training at a customer data center.

In some implementations, a vendor may want to train the model using a random order of training for customers using the model-to-data variant. For example, the model can be provided to Customer A with instructions to train the model on 20% of the customer's data. The model can be re-trained, successively, by each of Customers B-Z, also with instructions to train the model using 20% of their data. Once all the customers have re-trained the model using 20% of their data, the vendor can optionally enter into another phase of re-training. For example, in any order of the customers, each of the Customers A-Z can be instructed to re-train the model with the next N % (for example 30%) of their data. Each time a customer re-trains the model, the model has previously been trained or re-trained by the other customers up to that point.

In some implementations, vendors or other entities can specify how training is to be done. For example, the vendors can specify how many customers and the profiles of the types of customers that are to be used for training. In this example, the training broker can select the specific customers and which industry, for example, the customers are to be selected from.

EXAMPLES

In the following examples for training ML models, which can reflect the collected knowledge of several organizations, each organization can have its own database, and a customer can be an organization or many organizations.

In an example of an information services model, a vendor may offer to provide an information service powered by machine learning and based on the data of participating customers. If a customer wants to consume (or subscribe to) the service, the customer can agree to provide data to the vendor. The vendor can use the data of all contributing customers to create and provide the service to the participating customers. In some implementations of the information services model, the vendor can offer the service to customers for a price, and the vendor can optionally provide a discounted price to customers who provide data supporting the service.

In a first example, a vendor may want to offer a service that provides recommendations related to marketing investments spent for different advertising channels. The customers can provide data regarding their products, revenue, and marketing activities.

The ML model can use, as inputs, parameters associated with customer inference, such as product type (for example, headphones, television, or clothing), price of the product(s), and the type marketing used (for example, ad channels including email campaigns, online ads, television ads, or newspaper ads). The model can return an assessed value for the channel. For example, the model may rate television ads with a 0.3 value, email ads with a 0.1 value, and online ads with a 0.8 value, indicating to the customer that online ads provide the highest value channel for marketing.

In this example, the information needed to train the model can include, in addition to customer inference values, information associated with marketing costs and sales volume before and after a particular campaign. Parameters can be normalized so as not to expose company internal secrets. As an example, sales volume values can be normalized to one million (or another value). In this way, the actual sales information is not visible to the vendor, but changes to scaled values (for example, a change from 1 million to 1.2 million) are visible. In some implementations, public ontologies can be used to normalize product types and advertising channels.

In a second example, a vendor may want to offer a service providing recommendations of applicants for job postings. The customer subscribing to the service can provide data on the applicant, including the applicant's résumé, the job description, and the career success of the applicant. The ML model can use input parameters such as data from the résumé and the job profile to create, for example, an assessment or prediction of how well the candidate is likely to perform in his or her career. The hiring organization can then focus on inviting high-rated candidates for an interview.

The model can be trained using résumé information, job profile information, hire/no-hire decisions, annual performance reviews, and career path. A public ontology (or vendor ontology) can be used to normalize the job profiles and information in the résumé, such as educational background, knowledge, and experience.

Figure 5:
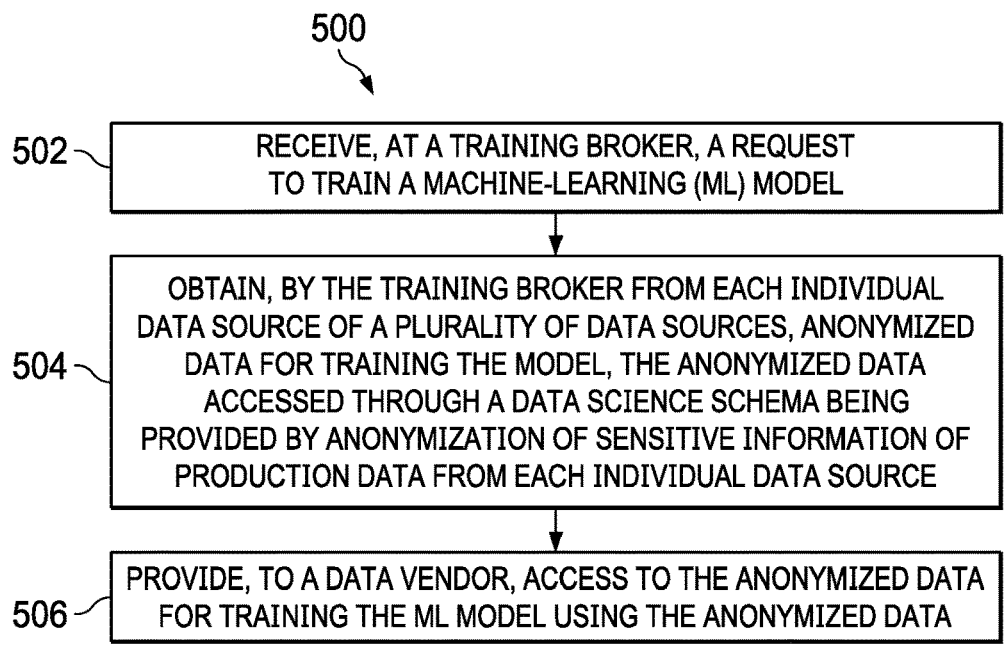
FIG. 5 is a flowchart illustrating an example of a computer-implemented method for using a training broker to broker anonymized data used for machine learning training of a model, according to an implementation of the present disclosure.

FIG. 5 is a flowchart illustrating an example of a computer-implemented method 500 for using a training broker to broker anonymized data used for machine learning training of a model, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, a request to train a machine-learning (ML) model is received at a training broker. As an example, referring to FIG. 3A (at step 1 302), the training broker 212 can receive a request from the vendor data center 304. The request can be made to train the scenario X, including requesting that the related data to be cached. From 502, method 500 proceeds to 504.

At 504, anonymized data for training the model is obtained by the training broker from each individual data source of a plurality of data sources. The anonymized data is accessed through a data science schema being provided by anonymization of sensitive information of production data from each individual data source. For example, at steps 2a-2m 324, the training broker 212 can read records from participating customers 308. Reading the data can include accessing single records of customers called by the training broker 212. Access to the data can be provided through the data science schema 110, for example. From 504, method 500 proceeds to 506.

At 506, access to the anonymized data is provided to a data vendor for training the ML model using the anonymized data. As an example, after the data has been accessed and cached by the training broker 212, model training can occur at step 3 326 when access to the cache is provided for training. During the time that actual training is performed on data read from the training broker 212, the training broker 212 can deliver records randomly from all connected customers. After 506, method 500 can stop.

In some implementations, including implementations that are based on the data-to-model variant, obtaining the anonymized data and subsequent training of the ML model includes the following interactions between the training broker, the individual data sources, and the data vendor. A request for the anonymized data is provided to each individual data source of the plurality of data sources, and the anonymized data is received from each individual data source of the plurality of data sources. The anonymized data is stored in a cache maintained by the training broker, and access to the anonymized data is provided to a data vendor. For example, by the steps 2a-2m 324, the training broker 212 can read records from participating customers 308. The training broker 212 caches (306) the data, and access to the cache is provided to the vendor data center 304 for training at step 3 326.

In some implementations, including implementations that are based on the mode-to-data variant, obtaining the anonymized data and subsequent training of the ML model includes the following interactions between the training broker, the individual data sources, and the data vendor. The model is provided to each individual data source of the plurality of data sources. An updated model is received from each individual data source of the plurality of data sources, where the updated model is created by the individual data source using machine learning model training executed at the individual data source and using the anonymized data locally available to the individual data source. The providing and the receiving are repeated for other individual data sources of the plurality of data sources. The updated model is provided by the training broker to the data vendor. As an example, referring to FIG. 4A, at step 2a 406, the training broker 212 can provide the root model to a first customer of a pipeline of customers 308, for additional training on the customer's data. At step 3a 408, the first customer can re-train the model using the data of customer 1. At step 4a 410, after training the model, the first customer can pass the re-trained model to the training broker 212. At step 5 426, the training broker 212 can pass the model to the vendor data center 304 where the updated model can be tested for accuracy by the vendor.

In some implementations, method 500 can further include creating and using the data science schema. For example, the data science schema 110 can be created based on a production data schema 108 of the production data. The data science schema provides read-only access to the production data, and access is limited to non-personalized data in the production data. By using the data science schema 110, replication of non-personalized data is not required. The data science schema is used to provide access to the production data.

In some implementations, method 500 can further include providing access to the data science schema for review by a user at each individual data source. For example, customers 308 can be provided with APIs that are used to expose the data, so that the customers can verify that exposed data is acceptable.

In some implementations, method 500 can further include scaling numerical values in the anonymized data to remove numerical values traceable to the individual data source. For example, numeric values can be scaled by an arbitrary number. In this way, amplitudes of (and relative relationships within) numerical data can be compared without exposing actual values.

In some implementations, method 500 can further include mapping fields in the production data to GUIDs to remove values traceable to the individual data source. The GUIDs can be stored with the anonymized data, for example.

In some implementations, method 500 can further include the use of a pipeline. A pipeline (for example, the pipeline 120) is created for receiving a subset of the production data (for example, from the tables 112). Production data is read to provide training data needed to train the ML model. The training data is stored, for example, in database tables 116 accessible to the pipeline 120. Access to the database tables can be provided, for example, using the data science schema 110.

Figure 6:
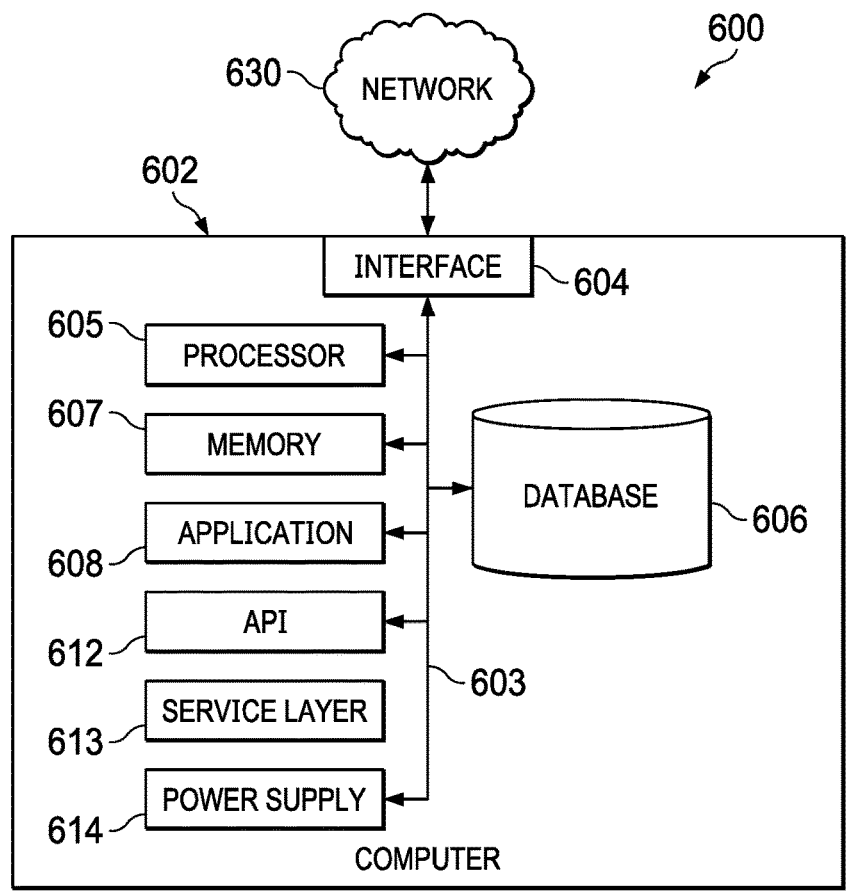
FIG. 6 is a block diagram illustrating an example of a computer-implemented system used to provide computational functionalities associated with described algorithms, methods, functions, processes, flows, and procedures, according to an implementation of the present disclosure.

FIG. 6 is a block diagram illustrating an example of a computer-implemented System 600 used to provide computational functionalities associated with described algorithms, methods, functions, processes, flows, and procedures, according to an implementation of the present disclosure. In the illustrated implementation, System 600 includes a Computer 602 and a Network 630.

The illustrated Computer 602 is intended to encompass any computing device, such as a server, desktop computer, laptop/notebook computer, wireless data port, smart phone, personal digital assistant (PDA), tablet computer, one or more processors within these devices, or a combination of computing devices, including physical or virtual instances of the computing device, or a combination of physical or virtual instances of the computing device. Additionally, the Computer 602 can include an input device, such as a keypad, keyboard, or touch screen, or a combination of input devices that can accept user information, and an output device that conveys information associated with the operation of the Computer 602, including digital data, visual information, audio information, another type of information, or a combination of types of information, on a graphical-type user interface (UI) (or GUI) or other UI.

The Computer 602 can serve in a role in a distributed computing system as, for example, a client, network component, a server, or a database or another persistency, or a combination of roles for performing the subject matter described in the present disclosure. The illustrated Computer 602 is communicably coupled with a Network 630. In some implementations, one or more components of the Computer 602 can be configured to operate within an environment, or a combination of environments, including cloud-computing, local, or global.

At a high level, the Computer 602 is an electronic computing device operable to receive, transmit, process, store, or manage data and information associated with the described subject matter. According to some implementations, the Computer 602 can also include or be communicably coupled with a server, such as an application server, e-mail server, web server, caching server, streaming data server, or any combination of servers.

The Computer 602 can receive requests over Network 630 (for example, from a client software application executing on another Computer 602) and respond to the received requests by processing the received requests using a software application or a combination of software applications. In addition, requests can also be sent to the Computer 602 from internal users (for example, from a command console or by another internal access method), external or third-parties, or other entities, individuals, systems, or computers.

Each of the components of the Computer 602 can communicate using a System Bus 603. In some implementations, any or all of the components of the Computer 602, including hardware, software, or a combination of hardware and software, can interface over the System Bus 603 using an application programming interface (API) 612, a Service Layer 613, or a combination of the API 612 and Service Layer 613. The API 612 can include specifications for routines, data structures, and object classes. The API 612 can be either computer-language independent or dependent and refer to a complete interface, a single function, or a set of APIs. The Service Layer 613 provides software services to the Computer 602 or other components (whether illustrated or not) that are communicably coupled to the Computer 602. The functionality of the Computer 602 can be accessible for all service consumers using the Service Layer 613. Software services, such as those provided by the Service Layer 613, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 602, alternative implementations can illustrate the API 612 or the Service Layer 613 as stand-alone components in relation to other components of the Computer 602 or other components (whether illustrated or not) that are communicably coupled to the Computer 602. Moreover, any or all parts of the API 612 or the Service Layer 613 can be implemented as a child or a sub-module of another software module, enterprise application, or hardware module without departing from the scope of the present disclosure.

The Computer 602 includes an Interface 604. Although illustrated as a single Interface 604, two or more Interfaces 604 can be used according to particular needs, desires, or particular implementations of the Computer 602. The Interface 604 is used by the Computer 602 for communicating with another computing system (whether illustrated or not) that is communicatively linked to the Network 630 in a distributed environment. Generally, the Interface 604 is operable to communicate with the Network 630 and includes logic encoded in software, hardware, or a combination of software and hardware. More specifically, the Interface 604 can include software supporting one or more communication protocols associated with communications such that the Network 630 or hardware of Interface 604 is operable to communicate physical signals within and outside of the illustrated Computer 602.

The Computer 602 includes a Processor 605. Although illustrated as a single Processor 605, two or more Processors 605 can be used according to particular needs, desires, or particular implementations of the Computer 602. Generally, the Processor 605 executes instructions and manipulates data to perform the operations of the Computer 602 and any algorithms, methods, functions, processes, flows, and procedures as described in the present disclosure.

The Computer 602 also includes a Database 606 that can hold data for the Computer 602, another component communicatively linked to the Network 630 (whether illustrated or not), or a combination of the Computer 602 and another component. For example, Database 606 can be an in-memory or conventional database storing data consistent with the present disclosure. In some implementations, Database 606 can be a combination of two or more different database types (for example, a hybrid in-memory and conventional database) according to particular needs, desires, or particular implementations of the Computer 602 and the described functionality. Although illustrated as a single Database 606, two or more databases of similar or differing types can be used according to particular needs, desires, or particular implementations of the Computer 602 and the described functionality. While Database 606 is illustrated as an integral component of the Computer 602, in alternative implementations, Database 606 can be external to the Computer 602.

The Computer 602 also includes a Memory 607 that can hold data for the Computer 602, another component or components communicatively linked to the Network 630 (whether illustrated or not), or a combination of the Computer 602 and another component. Memory 607 can store any data consistent with the present disclosure. In some implementations, Memory 607 can be a combination of two or more different types of memory (for example, a combination of semiconductor and magnetic storage) according to particular needs, desires, or particular implementations of the Computer 602 and the described functionality. Although illustrated as a single Memory 607, two or more Memories 607 or similar or differing types can be used according to particular needs, desires, or particular implementations of the Computer 602 and the described functionality. While Memory 607 is illustrated as an integral component of the Computer 602, in alternative implementations, Memory 607 can be external to the Computer 602.

The Application 608 is an algorithmic software engine providing functionality according to particular needs, desires, or particular implementations of the Computer 602, particularly with respect to functionality described in the present disclosure. For example, Application 608 can serve as one or more components, modules, or applications. Further, although illustrated as a single Application 608, the Application 608 can be implemented as multiple Applications 608 on the Computer 602. In addition, although illustrated as integral to the Computer 602, in alternative implementations, the Application 608 can be external to the Computer 602.

The Computer 602 can also include a Power Supply 614. The Power Supply 614 can include a rechargeable or disposable battery that can be configured to be either user- or non-user-replaceable. In some implementations, the Power Supply 614 can include power-conversion or management circuits (including recharging, standby, or another power management functionality). In some implementations, the Power Supply 614 can include a power plug to allow the Computer 602 to be plugged into a wall socket or another power source to, for example, power the Computer 602 or charge a rechargeable battery.

There can be any number of Computers 602 associated with, or external to, a computer system containing Computer 602, each Computer 602 communicating over Network 630. Further, the term "client," "user," or other appropriate terminology can be used interchangeably, as appropriate, without departing from the scope of the present disclosure. Moreover, the present disclosure contemplates that many users can use one Computer 602, or that one user can use multiple Computers 602.

Described implementations of the subject matter can include one or more features, alone or in combination.

For example, in a first implementation, a computer-implemented method includes: receiving, at a training broker, a request to train a machine-learning (ML) model; obtaining, by the training broker from each individual data source of a plurality of data sources, anonymized data for training the model, the anonymized data accessed through a data science schema being provided by anonymization of sensitive information of production data from each individual data source; and providing, to a data vendor, access to the anonymized data for training the ML model using the anonymized data.

The foregoing and other described implementations can each, optionally, include one or more of the following features:

A first feature, combinable with any of the following features, wherein obtaining the anonymized data includes: providing, to each individual data source of the plurality of data sources, a request for the anonymized data; receiving, from each individual data source of the plurality of data sources, the anonymized data; and storing the anonymized data in a cache maintained by the training broker, wherein providing, to a data vendor, access to the anonymized data includes providing access to the cache.

A second feature, combinable with any of the previous or following features, wherein obtaining the anonymized data includes: providing, to each individual data source of the plurality of data sources, the model; receiving, from each individual data source of the plurality of data sources, an updated model, wherein the updated model is created by the individual data source using machine learning model training executed at the individual data source and using the anonymized data locally available to the individual data source; repeating the providing and the receiving for other individual data sources of the plurality of data sources; and providing, by the training broker to the data vendor, the updated model.

A third feature, combinable with any of the previous or following features, further including: creating the data science schema based on a production data schema of the production data, wherein the data science schema provides read-only access to the production data, and wherein the data science schema provides access limited to non-personalized data in the production data without replication of non-personalized data; and using the data science schema to provide access to the production data.

A fourth feature, combinable with any of the previous or following features, further including providing, to a user at each individual data source, access to the data science schema for review.

A fifth feature, combinable with any of the previous or following features, further including scaling numerical values in the anonymized data to remove numerical values traceable to the individual data source.

A sixth feature, combinable with any of the previous or following features, further including mapping fields in the production data to global unique identifiers (GUIDs) to remove values traceable to the individual data source and storing the GUIDs with the anonymized data.

A seventh feature, combinable with any of the previous or following features, further including: creating a pipeline for receiving a subset of the production data; reading the production data for training data needed to training ML model; storing the training data in database tables accessible to the pipeline; and providing access to the database tables using the data science schema.

In a second implementation, a computer-readable medium stores one or more instructions executable by a computer system to perform operations including: providing, to each individual data source of the plurality of data sources, a request for the anonymized data; receiving, from each individual data source of the plurality of data sources, the anonymized data; and storing the anonymized data in a cache maintained by the training broker, wherein providing, to a data vendor, access to the anonymized data includes providing access to the cache.

The foregoing and other described implementations can each, optionally, include one or more of the following features:

A first feature, combinable with any of the following features, wherein obtaining the anonymized data includes: providing, to each individual data source of the plurality of data sources, a request for the anonymized data; receiving, from each individual data source of the plurality of data sources, the anonymized data; and storing the anonymized data in a cache maintained by the training broker, wherein providing, to a data vendor, access to the anonymized data includes providing access to the cache.

A second feature, combinable with any of the previous or following features, wherein obtaining the anonymized data includes: providing, to each individual data source of the plurality of data sources, the model; receiving, from each individual data source of the plurality of data sources, an updated model, wherein the updated model is created by the individual data source using machine learning model training executed at the individual data source and using the anonymized data locally available to the individual data source; repeating the providing and the receiving for other individual data sources of the plurality of data sources; and providing, by the training broker to the data vendor, the updated model.

A third feature, combinable with any of the previous or following features, the operations further including: creating the data science schema based on a production data schema of the production data, wherein the data science schema provides read-only access to the production data, and wherein the data science schema provides access limited to non-personalized data in the production data without replication of non-personalized data; and using the data science schema to provide access to the production data.

A fourth feature, combinable with any of the previous or following features, the operations further including providing, to a user at each individual data source, access to the data science schema for review.

A fifth feature, combinable with any of the previous or following features, the operations further including scaling numerical values in the anonymized data to remove numerical values traceable to the individual data source.

A sixth feature, combinable with any of the previous or following features, the operations further including mapping fields in the production data to global unique identifiers (GUIDs) to remove values traceable to the individual data source and storing the GUIDs with the anonymized data.

A seventh feature, combinable with any of the previous or following features, the operations further including: creating a pipeline for receiving a subset of the production data; reading the production data for training data needed to training ML model; storing the training data in database tables accessible to the pipeline; and providing access to the database tables using the data science schema.

In a third implementation, a computer-implemented system includes: one or more computers; and one or more computer memory devices interoperably coupled with the one or more computers and having tangible, non-transitory, machine-readable media storing one or more instructions that, when executed by the one or more computers, perform one or more operations including: providing, to each individual data source of the plurality of data sources, a request for the anonymized data; receiving, from each individual data source of the plurality of data sources, the anonymized data; and storing the anonymized data in a cache maintained by the training broker, wherein providing, to a data vendor, access to the anonymized data includes providing access to the cache.

The foregoing and other described implementations can each, optionally, include one or more of the following features:

A first feature, combinable with any of the following features, wherein obtaining the anonymized data includes: providing, to each individual data source of the plurality of data sources, a request for the anonymized data; receiving, from each individual data source of the plurality of data sources, the anonymized data; and storing the anonymized data in a cache maintained by the training broker, wherein providing, to a data vendor, access to the anonymized data includes providing access to the cache.

A second feature, combinable with any of the previous or following features, wherein obtaining the anonymized data includes: providing, to each individual data source of the plurality of data sources, the model; receiving, from each individual data source of the plurality of data sources, an updated model, wherein the updated model is created by the individual data source using machine learning model training executed at the individual data source and using the anonymized data locally available to the individual data source; repeating the providing and the receiving for other individual data sources of the plurality of data sources; and providing, by the training broker to the data vendor, the updated model.

A third feature, combinable with any of the previous or following features, the operations further including: creating the data science schema based on a production data schema of the production data, wherein the data science schema provides read-only access to the production data, and wherein the data science schema provides access limited to non-personalized data in the production data without replication of non-personalized data; and using the data science schema to provide access to the production data.

Implementations of the subject matter and the functional operations described in this specification can be implemented in digital electronic circuitry; in tangibly embodied computer software or firmware; in computer hardware, including the structures disclosed in this specification and their structural equivalents; or in any combination of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or an internet browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
   receiving, at a training broker, a request from a data vendor to train a machine-learning (ML) model, wherein the request includes a request to train a specific scenario and to cache data related to the specific scenario;
   obtaining, by the training broker from each individual data source of a plurality of data sources separate from the training broker and separate from the data vendor, anonymized data for training the model, the anonymized data accessed through a data science schema being provided by anonymization of sensitive information of production data from each individual data source;
   creating the data science schema based on a production data schema of the production data, wherein the data science schema provides read-only access to the production data, and wherein the data science schema provides access limited to non-personalized data in the production data without replication of non-personalized data;
   and
   using the data science schema and a cache maintained by the training broker to provide, to the data vendor, cached access to the anonymized data for training the ML model using the anonymized data, including providing access to the cache.

2. The computer-implemented method of claim 1, wherein obtaining the anonymized data comprises:
   providing, to each individual data source of the plurality of data sources, a request for the anonymized data; and
   receiving, from each individual data source of the plurality of data sources, the anonymized data.

3. The computer-implemented method of claim 1, wherein obtaining the anonymized data comprises:
   providing, to each individual data source of the plurality of data sources, the model;
   receiving, from each individual data source of the plurality of data sources, an updated model, wherein the updated model is created by the individual data source using machine learning model training executed at the individual data source and using the anonymized data locally available to the individual data source;
   repeating the providing and the receiving for other individual data sources of the plurality of data sources; and
   providing, by the training broker to the data vendor, the updated model.

4. The computer-implemented method of claim 1, further comprising:
   providing, to a user at each individual data source, access to the data science schema for review.

5. The computer-implemented method of claim 2, further comprising:
   scaling numerical values in the anonymized data to remove numerical values traceable to the individual data source.

6. The computer-implemented method of claim 1, further comprising:
   mapping fields in the production data to global unique identifiers (GUIDs) to remove values traceable to the individual data source; and
   storing the GUIDs with the anonymized data.

7. The computer-implemented method of claim 1, further comprising:
   creating a pipeline for receiving a subset of the production data;
   reading the production data for training data needed to train the ML model;
   storing the training data in database tables accessible to the pipeline; and
   providing access to the database tables using the data science schema.

8. A non-transitory, computer-readable medium storing one or more instructions executable by a computer system to perform operations comprising:
   receiving, at a training broker, a request from a data vendor to train a machine-learning (ML) model, wherein the request includes a request to train a specific scenario and to cache data related to the specific scenario;
   obtaining, by the training broker from each individual data source of a plurality of data sources separate from the training broker and separate from the data vendor, anonymized data for training the model, the anonymized data accessed through a data science schema being provided by anonymization of sensitive information of production data from each individual data source;
   creating the data science schema based on a production data schema of the production data, wherein the data science schema provides read-only access to the production data, and wherein the data science schema provides access limited to non-personalized data in the production data without replication of non-personalized data;
   and
   using the data science schema and a cache maintained by the training broker to provide, to the data vendor, cached access to the anonymized data for training the ML model using the anonymized data, including providing access to the cache.

9. The non-transitory, computer-readable medium of claim 8, wherein obtaining the anonymized data comprises:
   providing, to each individual data source of the plurality of data sources, a request for the anonymized data; and receiving, from each individual data source of the plurality of data sources, the anonymized data.

10. The non-transitory, computer-readable medium of claim 8, wherein obtaining the anonymized data comprises:
   providing, to each individual data source of the plurality of data sources, the model;
   receiving, from each individual data source of the plurality of data sources, an updated model, wherein the updated model is created by the individual data source using machine learning model training executed at the individual data source and using the anonymized data locally available to the individual data source;
   repeating the providing and the receiving for other individual data sources of the plurality of data sources; and
   providing, by the training broker to the data vendor, the updated model.

11. The non-transitory, computer-readable medium of claim 8, the operations further comprising:
   providing, to a user at each individual data source, access to the data science schema for review.

12. The non-transitory, computer-readable medium of claim 9, the operations further comprising:
   scaling numerical values in the anonymized data to remove numerical values traceable to the individual data source.

13. The non-transitory, computer-readable medium of claim 8, the operations further comprising:
   mapping fields in the production data to global unique identifiers (GUIDs) to remove values traceable to the individual data source; and
   storing the GUIDs with the anonymized data.

14. The non-transitory, computer-readable medium of claim 8, the operations further comprising:
   creating a pipeline for receiving a subset of the production data;
   reading the production data for training data needed to train the ML model;
   storing the training data in database tables accessible to the pipeline; and
   providing access to the database tables using the data science schema.

15. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      receiving, at a training broker, a request from a data vendor to train a machine-learning (ML) model, wherein the request includes a request to train a specific scenario and to cache data related to the specific scenario;
      obtaining, by the training broker from each individual data source of a plurality of data sources separate from the training broker and separate from the data vendor, anonymized data for training the model, the anonymized data accessed through a data science schema being provided by anonymization of sensitive information of production data from each individual data source;
      creating the data science schema based on a production data schema of the production data, wherein the data science schema provides read-only access to the production data, and wherein the data science schema provides access limited to non-personalized data in the production data without replication of non-personalized data;
      and
      using the data science schema and a cache maintained by the training broker to provide, to the data vendor, cached access to the anonymized data for training the ML model using the anonymized data, including providing access to the cache.

16. The computer-implemented system of claim 15, wherein obtaining the anonymized data comprises:
   providing, to each individual data source of the plurality of data sources, a request for the anonymized data; and
   receiving, from each individual data source of the plurality of data sources, the anonymized data.

17. The computer-implemented system of claim 15, wherein obtaining the anonymized data comprises:
   providing, to each individual data source of the plurality of data sources, the model;
   receiving, from each individual data source of the plurality of data sources, an updated model, wherein the updated model is created by the individual data source using machine learning model training executed at the individual data source and using the anonymized data locally available to the individual data source;
   repeating the providing and the receiving for other individual data sources of the plurality of data sources; and
   providing, by the training broker to the data vendor, the updated model.

\* \* \* \* \*